Patented May 12, 1931

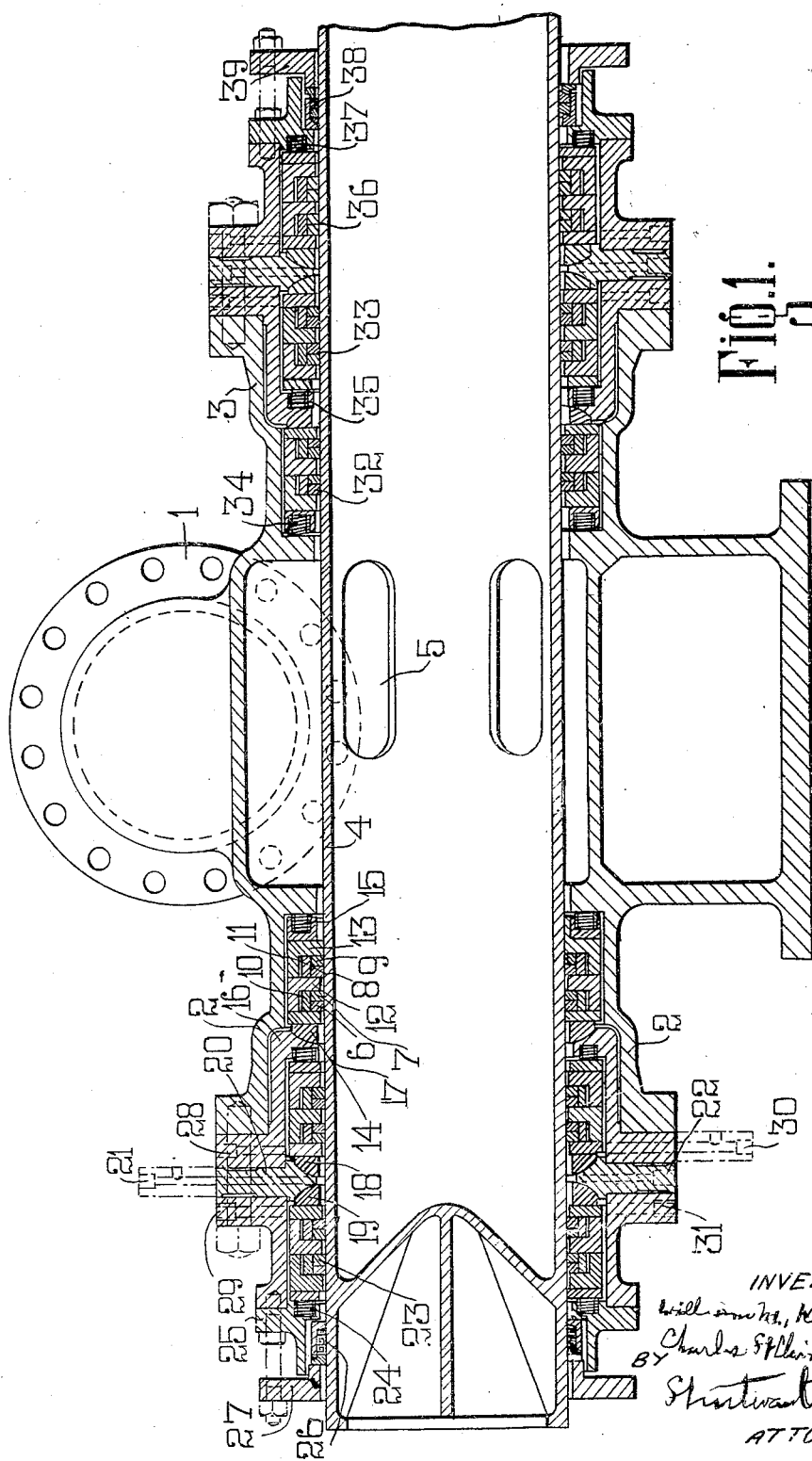

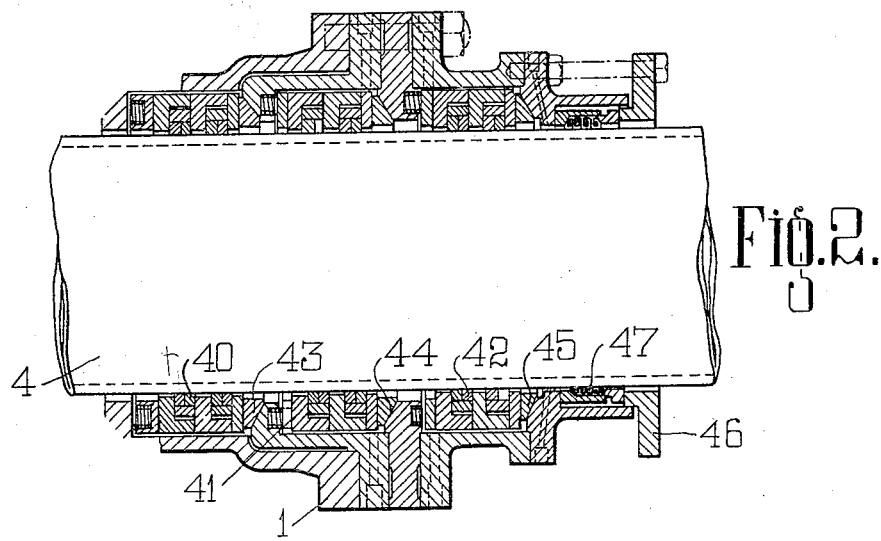
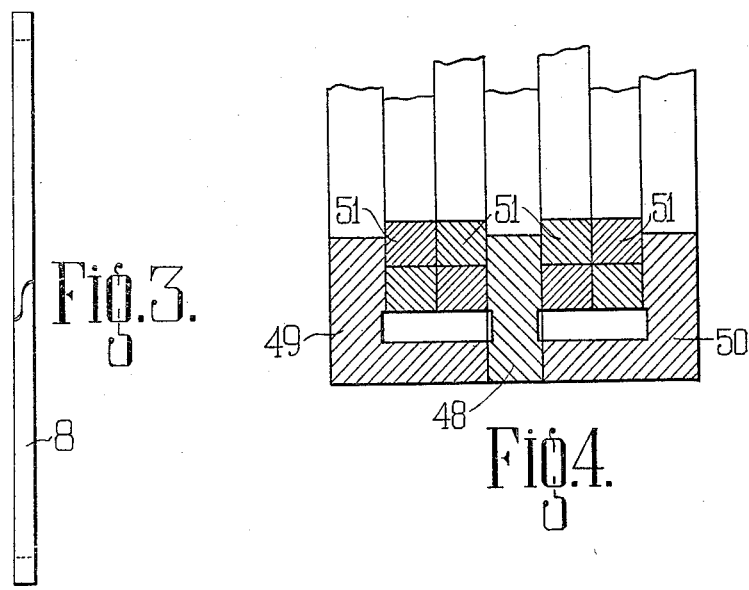

1,805,335

UNITED STATES PATENT OFFICE

WILLIAM MARSDEN KERMODE AND CHARLES ST. CLAIR PLUMMER, OF BRADFORD, ENGLAND

EXPANSION PIPE JOINT AND THE LIKE

Application filed April 11, 1928, Serial No. 269,269, and in Great Britain June 7, 1927.

The present invention relates to improvements in expansion pipe joints and the like, particularly suitable for the connection of steam supply pipes.

The invention is more particularly described with reference to a T expansion joint suitable for use for the steam supply of turbines taken by way of example.

According to the present invention, pairs of split elastic metal packing rings encircled by at least one elastic metal packing ring are provided between a joint casing and an internal tubular element.

The invention is more particularly described with reference to the accompanying drawings in which:—

Figure 1 is a sectional elevation showing one form of construction according to the present invention.

Figure 2 shows a modified form of construction in sectional elevation.

Figure 3 is a side view of one of the metallic packing rings.

Figure 4 is a detail view of a modification.

A joint casing 1 has side casing extensions 2, 3, enclosing a common tube element 4 perforated at 5 suitable to act as an expansion joint or piece for the steam connection of a turbine taken by way of example.

In the construction shown on the left-hand side of the figure, the casing extension 2 is recessed to receive pairs of split packing rings 6, 7, 8, 9, arranged within an external clip ring 10, 11 respectively, these three rings being held within a circular cup or container 12, 13 respectively. This assembly is held up against a packing ring 14 having a spherical surface by means of an axial spring ring 15.

The corresponding spherical surface cooperating with the spherical surfaced ring 14 can be provided on a sleeve 16 acting as an abutment for axial compression rings 17 similar to the springs 15 and this sleeve 16 may house a second group of spring packing rings similar to the rings 6, 7, 8, 9, 10, 11. This second group or a further group if desired, and further, in tandem thereto are borne against one element of a double V packing ring 18, 19 engaging against a double conical packing surface on the fixed ring 20 perforated at the top to allow connections, for instance, at 21 to a steam supply and perforated below as at 22 for the escape of drainage water.

A group of rings 23 similar to the group 8, 9, 10, 11 and their housings is provided pressed oppositely to the aforementioned groups by axial springs 24 on a gland housing 25 receiving a gland packing 26 which can be adjusted upon the tube 4 by means of a gland follower 27.

If desired, of course, a second group of spring elements, such as 23, may be arranged in tandem with it acting oppositely to the groups on the right-hand side of the ring 18.

Steam connections 28, 29, with corresponding drain connections 30, 31 can be provided so that steam can be passed to the packing elements for preliminary heating purpose.

A similar packing construction is located in the right hand side 3 of the casing, the elements of which are indicated by reference numerals 32 to 39 inclusive.

In the modified form of construction shown in Figure 2 groups of spring metal packing rings 40, 41, 42 are provided bearing in tandem on spherical packing surfaces 43, 44, 45 all acting in one direction opposite to the direction of adjustment of the gland follower 46 acting on the adjustable packing 47.

It will be seen that by the various arrangements of the present invention movement of the tubular sleeve 4 is possible relatively to the joint casing 1, and the various elements of the packing can be warmed up, so that as the tube expands the packing rings can also expand to the same extent so that all the parts of the joint can be subjected to an even temperature rise.

As shown in Figure 3, the elastic metallic packing rings may be arranged with an overlapping joint, but these rings may take the form of any of the known types of ring having butt, stepped, or overlapped joints.

In certain cases it will be desirable to arrange that the packing rings 8, 9 of the innermost groups will be provided with butt joints to act as check rings and thereby reduce the pressure of steam or the like fluid acting on the succeeding sections.

It will be appreciated that with the packing arrangement of the present invention the pressure on the packing is independent of steam pressure.

Further the rings 8, 9, 10, 11 are arranged to be smaller than the internal diameter of the casing containing them in order to permit free circulation of steam for warming up the joints.

Gauges may be suitably connected to the steam inlets 21, 28, 29, so that various steam pressure on the packing is independent of different stages.

In the modified form of construction shown in Figure 4, a loose ring 48 is arranged between a pair of L section-containing rings 49, 50, receiving the packing rings 51 so that a wholly regular pressure is exerted on them.

We declare that what we claim is:—

A fluid pressure pipe joint including a tubular element, an outer casing extending around said tubular element to form at least one packing box, a plurality of series of at least two packing cups in said packing box, a pair of split elastic metal packing rings in each of said cups at least one clip ring in each of said cups, a spherical surfaced bearing member at one end of each series of cups and spring means at the other end of each of said series adapted to press the cups towards said bearing member in a direction axially of the tubular element, at least one of said groups of cups being spring pressed in a direction opposite to at least one other of said groups.

In witness whereof, we have hereunto signed our names this 27th day of March, 1928.

WILLIAM MARSDEN KERMODE.
CHARLES ST. CLAIR PLUMMER.